Figure 1:
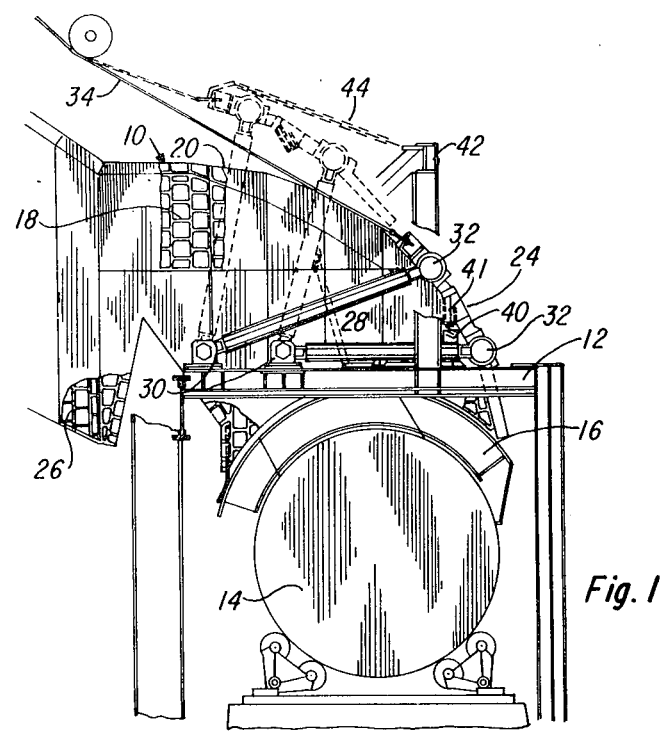

United States Patent [19]

Kallio

[11] Patent Number: 4,462,575

[45] Date of Patent: Jul. 31, 1984

[54] HOOD ASSEMBLY FOR A METALLURGICAL CONVERTER

[75] Inventor: William R. Kallio, Noranda, Canada

[73] Assignee: Noranda Mines Limited, Toronto, Canada

[21] Appl. No.: 337,831

[22] Filed: Jan. 7, 1982

[30] Foreign Application Priority Data

Jan. 29, 1981 [CA] Canada ................................. 369679

[51] Int. Cl.³ .............................................. C21C 5/38
[52] U.S. Cl. ............................... 266/158; 98/115 VM
[58] Field of Search ..... 266/158; 98/115 R, 115 VM; 49/41, 394, 197, 203; 16/82, 85

[56] References Cited

U.S. PATENT DOCUMENTS

| | | | |
|---|---|---|---|
| 2,305,275 | 12/1942 | Pyle et al. | 49/394 |
| 2,704,376 | 3/1955 | Berry | 16/85 |
| 3,848,860 | 11/1974 | Maeda et al. | 266/158 |
| 3,861,080 | 1/1975 | Schibli et al. | 49/394 |
| 4,103,879 | 8/1978 | Calderon | 266/158 |
| 4,213,829 | 7/1980 | Friend et al. | 202/262 |

FOREIGN PATENT DOCUMENTS 737487 6/1980 U.S.S.R. ............................ 266/158

Primary Examiner—Michael L. Lewis
Attorney, Agent, or Firm—Fleit, Jacobson, Cohn & Price

[57] ABSTRACT

A hood assembly for use with a metallurgical converter is disclosed. The hood assembly comprises a hood resting on a supporting structure and having sidewalls the lower ends of which extend downwardly to a short distance from the apron plate of the converter and around a portion of the periphery of the converter corresponding to the angular movement of the mouth of the converter from the blowing to the charging position, and the upper ends of which follow a curve-linear or straight path extending from the upper back end of the hood until it meets with the lower ends of the sidewalls at the front of the hood, and a roof bridging the sidewalls except for an opening at the front of the hood extending over the mouth of the converter in the charging position. A gate extends over the opening in the roof of the hood and a pair of lifting arms are located on each side of the hood for pivoting the gate in a convex curved path from a closed position over the opening in the roof to an open position over the roof of the hood.

6 Claims, 2 Drawing Figures

HOOD ASSEMBLY FOR A METALLURGICAL CONVERTER

This invention relates to a hood assembly for metallurgical converters.

Metallurgical converters, such as used in the conversion of copper matte to metallic copper, are very well known in the art. Such converters are provided with tuyeres in the side thereof for blowing air into the molten material and are rotatably movable from such blowing position wherein the tuyeres are located below the level of molten metal in the converter to various angular positions including a charging position, a slag skimming position and a copper pouring position. The above converters are provided with a mouth which is surrounded by a replaceable apron plate. A hood is generally mounted over the mouth of the converter for collecting $SO_2$ gases escaping from the converter during the blowing operation. Such hoods have side walls which generally extend downwardly a short distance above the apron plate over a substantial portion of the circumference of the converter with a roof and a movable gate so as to cover the mouth of the converter not only in the blowing position but also in the charging and skimming positions to prevent escape of gases into the plant. In order to provide access to the mouth of the converter, either for charging or cleaning the mouth of the converter, a suitable movable gate must be provided in the hood. It has generally been the practice to provide a sliding gate, such as disclosed in Canadian Pat. No. 988,293 issued May 4, 1975.

However, the use of sliding gates requires a lot of head space above the converter to prevent interference with the operation of the overhead crane which is normally employed for moving the ladles used to charge and discharge the converters. The use of sliding gates is also objectionable in that the rails upon which the gate is moved must be kept clean for proper sliding operation of the gate and this requires a lot of maintenance.

It is therefore the object of the present invention to provide a hood assembly having a gate which requires a minimum amount of head room above the converter and which needs a minimum of maintenance.

The hood assembly, in accordance with the present invention, comprising a supporting structure, a hood resting on the supporting structure and having sidewalls the lower ends of which extend downwardly to a short distance from the apron plate and around a portion of the periphery of the converter corresponding to the angular movement of the mouth of the converter from the blowing to the charging position, and the upper ends of which follow a curvelinear or straight path from the upper back end of the hood until it meets with the lower ends of the sidewalls at the front of the hood, and a roof bridging the sidewalls except for an opening at the front of the hood extending over the mouth of the converter in the charging position, a gate extending over the opening in the roof of the hood, a pair of lifting arms located on each side of the hood for pivoting the gate in a convex curved path from a closed position over the opening in the roof to an open position over the roof of the hood for providing access to the mouth of the converter, and means associated with the gate for moving the gate from a closed to an open position and vice-versa.

The lower ends of the lifting arms of each pair of arms are preferably pivotally mounted a first predetermined distance apart on the supporting structure and the upper ends pivotally connected to the edges of the gate at a second predetermined distance apart so as to cause the gate to follow said convex curved path in its movement from a closed to an open position.

The means for moving the gate from a closed to an open position is preferably a winch having two cables attached to the gate and another cable attached to a counterweight.

A strut is pivotally mounted on the supporting structure on each side of the hood and adapted to engage one of the lifting arms for locking the gate in an open position when men are working around the converter mouth and hood opening area.

A shock absorbing spring is mounted on the supporting structure on each side of the hood for arresting the downward movement of the gate when moved to a closed position by the winch motor.

Figure 2:
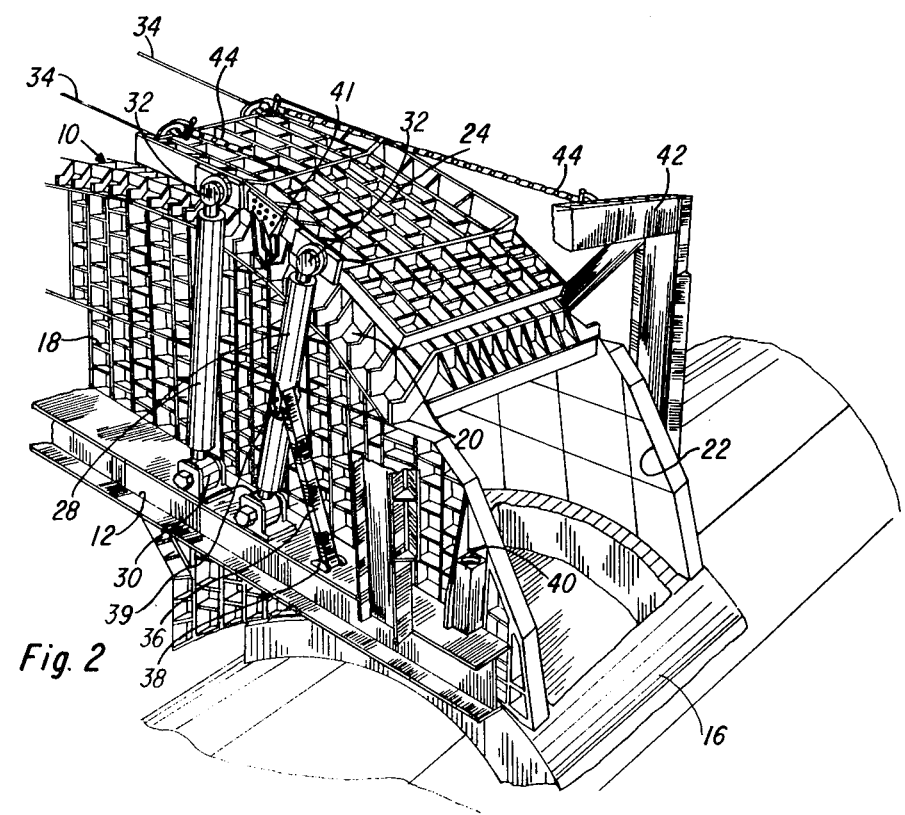

The invention will now be disclosed, by way of example, with reference to the accompanying drawings in which:

FIG. 1 is a side view of the hood assembly in accordance with the invention; and FIG. 2 is a perspective view of the hood assembly showing the gate in open position.

Referring to the drawings, there is shown a hood 10 mounted on a supporting structure 12 above the mouth of a converter 14. The mouth of the converter is conventionally surrounded by a replaceable apron plate 16. The hood has vertical sidewalls 18, the lower ends of which extend downwardly to a short distance from the apron plate and around a portion of the periphery of the converter corresponding to the angular movement of the mouth of the converter from the blowing to the charging position, and the upper ends of which follow a curvelinear path extending from the upper back end of the hood until it meets with the lower ends of the sidewalls at the front of the hood. The upper ends of the sidewalls may also follow a straight path from the upper back end of the hood to the front of the hood. The sidewalls are bridged by a roof 20 except for a front opening portion 22 which is closed by a gate 24. The back of the hood is connected to a conventional flue 26. The sidewalls 18 and roof 20 are preferably made of cast stainless steel waffle design panels. The reason for using cast stainless steel as opposed to fabricated steel is that fabricated steel often creeps at elevated temperatures, resulting in severe permanent warping of the hood, leaving large openings at joints and between the apron plate and the hood sidewalls. Cast stainless steel creeps only at temperatures in excess of the temperature normally encountered in the hoods. Due to the tight fitting of the hood in accordance with the invention there is a lower air infiltration in the hood resulting in higher gas temperatures in the outlet flue and thus it is preferable to use cast stainless steel. The importance of the higher flue temperature is to allow spraying of the flue gases with water. Water spraying effectively lowers the resistivity of the particulate in the converter gases and increases recovery in the electrostatic precipitators used to treat the flue gases.

The gate 24 is shaped so as to close tightly on the upper edge of the sidewalls of the hood over the opening 22 in the roof and is supported by a pair of lifting arms 28 located on each side of the hood for pivoting the gate in a convex curved path from its closed position over the opening 22 in the roof to its open position over the roof to provide access to the mouth of the converter when the converter is in the charging position or for cleaning around the converter mouth. The lower ends of the lifting arms of each pair are pivotally mounted about pivotal joints 30 located at a predetermined distance apart on the supporting structure. The upper ends of the lifting arms of each pair are pivotally connected about pivotal bearings 32 mounted on the side edges of the gate at a predetermined distance apart. The location of the pivotal connections of the arm both on the supporting structure and on the side edges of the gate is such as to permit the lifting arms to adequately support the gate and cause it to follow the above mentioned convex curved path in its movement from a closed to an open position. As seen in FIGS. 1 and 2, the angle between the arms of each pair of lifting arms changes as the arms move to guide the gate from a raised to a lowered position over the opening in the hood assembly with a minimum of clearance space between the gate and the roof of the hood.

The gate is opened by means of a motor operated winch (not shown) having a pair of cables 34 attached to the opposite upper edges of the gate. A third cable is preferably wound on the winch and attached to a counterweight (not shown) for balancing the weight of the gate. A strut 36, one on each side of the hood, is pivotally connected about a pivotal connection 38 on the supporting structure and adapted to engage the lifting arm 28 on each side of the hood to latch the gate in open position for safety purposes when working around the converter mouth and hood opening area.

For lowering the gate, the winch motor is operated in the opposite direction. A shock absorbing spring 40 is mounted on the supporting structure on each side of the hood for arresting the downward movement of the gate when moved to a closed position.

An overhead beam 42 is provided for hood and gate protection against bumping by the crane hook or ladles carried by the crane. Safety chains 44 are also provided between the overhead beam 42 and the upper edge of the gate for arresting the upward movement of the gate when moved to an open position.

The above disclosed hood assembly operates as follows:

In the blowing position of the converter, the gate 24 is closed by operating the winch motor in the proper direction. The position of the pivotal joints 30 of the lifting arms 28 is such that the gate closes tightly on the upper portion of the sidewalls 18 over the opening 22 in the roof of the hood so that there is no substantial gas leak inside the plant. In the charging position of the converter, the gate is opened by operating the winch motor in the opposite direction to move the gate over the roof 20. The location of the pivotal joints 30 on the supporting structure and of the pivotal bearings on the side edges of the gate is such that the gate follows a convex curved path passing just over the roof so as to reduce the head space required over the hood to a minimum and present minimum interference to the free movement of the crane over the converter. In such a position, ladles of matte can be moved by the crane over the converter and discharged into the mouth of the converter. In the opened position of the gate, the normal draft of the flue is sufficient to draw the gas escaping from the mouth of the converter and prevent such gas from leaking inside the plant.

With the hood assembly in accordance with the present invention, the waste gas is thus drawn from the converter without any substantial leak to the outside both during blowing and charging of the converter, and while turning in and out of the blowing position. When the converter is in the skimming position the normal draft of the flue is also sufficient to draw the gas escaping from the mouth and ladle.

Although the invention has been disclosed with reference to a preferred embodiment, it is to be understood that other alternatives are also envisaged. Furthermore, the use of such hood assembly is not limited to the copper industry and could possibly be used in other applications in which metallurgical converters are utilized.

I claim:

1. A hood assembly having a front, rear, upper and lower portions, for use with a metallurgical converter having a mouth surrounded by an apron plate and able to rotate from a blowing position to a charging and skimming position, comprising:
   (a) a supporting structure;
   (b) a hood resting on said supporting structure and having sidewalls with upper and lower ends, said lower ends extending downwardly to a short distance from the apron plate and around a portion of the periphery of the converter corresponding to the angular movement of the mouth of a converter from the blowing to the charging position, and said upper ends following a curvelinear or straight path which extends from the upper back end of the hood until it meets with said lower ends of the sidewalls at the front of the hood, and a roof bridging the sidewalls except for an opening at the front of the hood extending over the mouth of the converter in the charging position;
   (c) a gate extending over the opening in the roof of the hood;
   (d) a pair of lifting arms located on each side of the hood, the arms of each pair having their lower ends pivotally mounted a first distance apart on said supporting structure and having their upper ends pivotally connected to the edges of the gate at a second distance apart, for pivoting said gate in a convex curved path from a closed position over the opening of the roof to an open position over the roof of the hood, said convex curved path generally following the upper ends of said sidewalls with a minimum of clearance space between said gate and said roof of the hood; and
   (e) means associated with said gate for moving said gate from a closed to an open position and vice-versa for providing access to the mouth of the converter.

2. A hood assembly as defined in claim 1, wherein the means for moving the gate from a closed to an open position is a motor operated winch having two cables attached to the gate and another cable attached to a counterweight.

3. A hood assembly as defined in claim 1, further comprising a strut located on each side of the hood and pivotally mounted at one end to the supporting structure and adapted to engage one of the lifting arms at its upper end to lock the gate in open position.

4. A hood assembly as defined in claim 1, further comprising a shock absorbing spring mounted on the supporting structure on each side of the hood for arresting the downward movement of the gate when moved to a closed position.

5. A hood assembly as defined in claim 1, further comprising an overhead beam mounted on said supporting structure for protecting said gate and the hood during charging of the converter.

6. A hood assembly as defined in claim 5, further comprising a safety chain interconnecting the overhead beam and the gate for arresting the upward movement of the gate when moved to its open position.

* * * * *